UNITED STATES PATENT OFFICE.

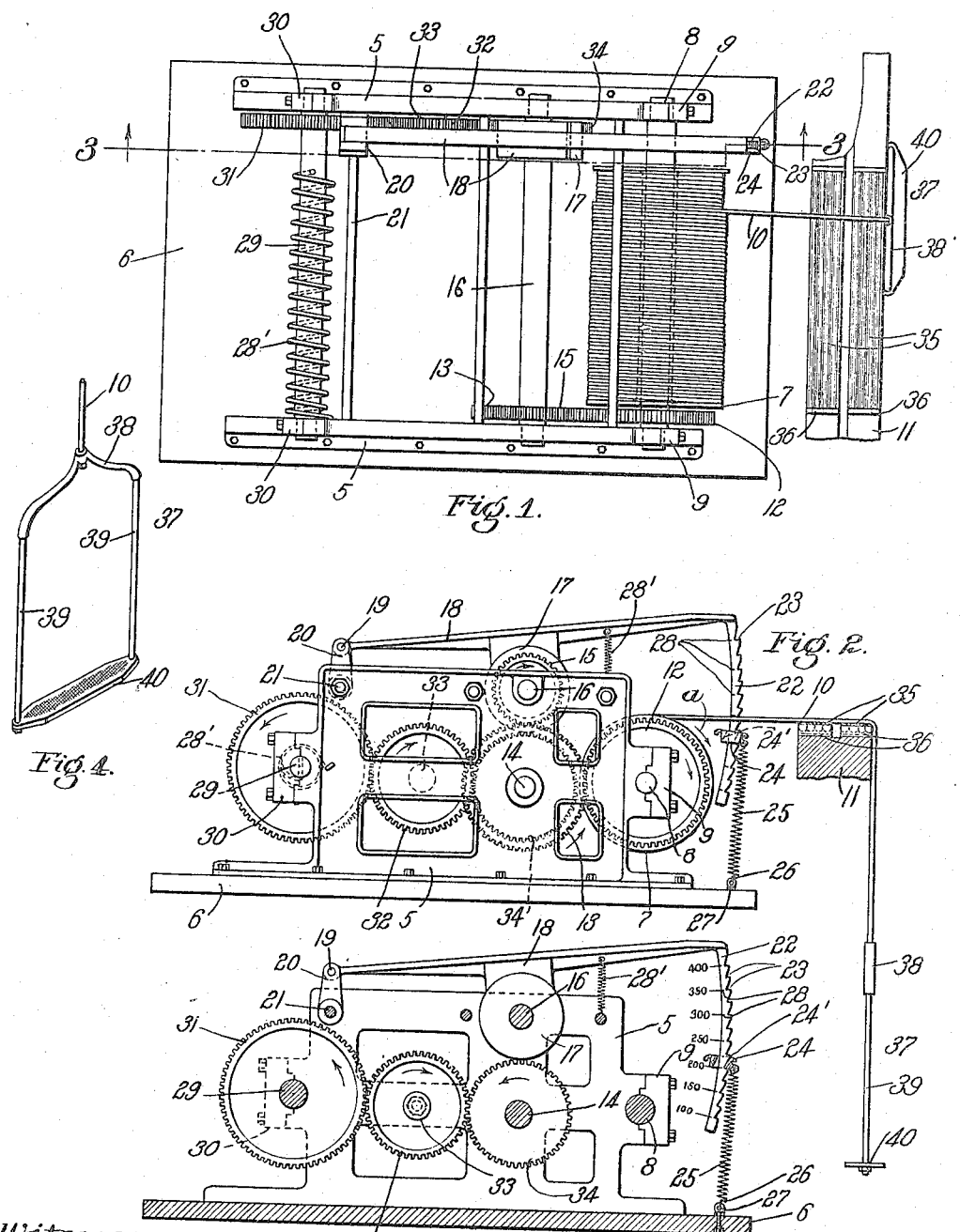

ISAAC FEIGENBAUM, OF CLEVELAND, OHIO.

LIFE-SAVING APPARATUS.

1,131,127.   Specification of Letters Patent.   Patented Mar. 9, 1915.

Application filed April 16, 1914. Serial No. 832,384.

*To all whom it may concern:*

Be it known that I, ISAAC FEIGENBAUM, a citizen of the United States, residing at Cleveland, in the county of Cuyahoga and State of Ohio, have invented new and useful Improvements in Life-Saving Apparatus, of which the following is a specification.

This invention relates to an improved life saving apparatus particularly adapted to be used as a fire escape, the object of the invention being to provide an apparatus which can be placed in the different rooms of a hotel or office building to enable those who are unable to descend by the staircase or elevators to escape to the ground quickly and without injury.

The apparatus is so constructed that the flexible member by which a person descends from the window to the ground will upon being released be automatically wound up on a reel, so that the apparatus can be used by one person and then upon the rope being released the apparatus is so constructed that the same will be wound up on the reel and another person can use the same to escape from the building.

The apparatus is so constructed that it may be set to give a certain speed of descent for persons of different weights.

The invention consists in the combination and arrangement of parts set forth in the following specification and particularly pointed out in the claims thereof.

Referring to the drawings: Figure 1 is a plan view of my improved life saving apparatus. Fig. 2 is a side elevation of the same. Fig. 3 is a sectional elevation taken on line 3—3 of Fig. 1. Fig. 4 is a perspective view of the carrier.

Like numerals refer to like parts throughout the several views of the drawings.

In the drawings, 5 is the frame of the apparatus. 6 is a part of said frame, ordinarily designated the bed-plate, 7 is a reel which is fastened to a shaft 8 journaled to rotate in bearings 9 on the frame of the machine. This reel has attached thereto a flexible member, such as a rope or cord 10, which extends from the reel outwardly over rollers 35 journaled to rotate on a frame 36 fast to the sill 11 of the window of the building. The shaft 8 has a gear 12 fastened thereto which meshes into a gear 13 fastened to a shaft 14 which is journaled to rotate in the frame 5. The gear 13 meshes into a gear 15 which is fastened to a shaft 16 journaled to rotate in bearings in the frame 5. Said shaft 16 has a drum 17 fastened thereto against the periphery of which a brake lever 18 bears. The brake lever 18 is pivoted at 19 to a bracket 20 fastened to a stay-rod 21 which extends across the machine and is fastened to the side frames 5 thereof. The free end of the brake lever 18 terminates in a segmental arm 22 substantially concentric with the pivot 19, and this segmental arm is provided with teeth 23 which are adapted to be engaged by a collar 24 which has a hole 24' extending therethrough and inclined at an angle. The lower edge of said collar engages one of the teeth 23 and the upper edge thereof engages the opposite edge of the arm 22 from that upon which said teeth are located (see Fig. 3).

The lower end of a spring 25 terminates in a hook 26 which engages an eye 27 rotatably mounted in the bed-plate 6, said bed-plate constituting a portion of the frame of the apparatus. The upper end of the spring 25 is connected to the collar 24. By moving the collar 24 upwardly or downwardly on the arm 22 the tension on the spring 25 will be increased or diminished, respectively, and consequently the pressure of the brake lever 18 upon the drum 17 may be correspondingly increased or diminished. The arm 22 has index marks 28 thereon which indicate the proper tension which is to be applied to the spring for persons of different weights. For example, if the bottom of the collar 24 registers with the mark 200, then the brake is set for a person weighing 200 pounds to descend by means of the flexible member 10, or, if the bottom of the collar registers with the mark 150 on the arm 22, then the apparatus is set for a person weighing 150 pounds to descend to the ground by means of the flexible member 10. Thus the apparatus can be set to give the same speed of descent to a person weighing 200 pounds as to a person weighing 150 pounds or to any weight between 100 and 400 pounds.

It is very desirable that after one person has descended to the ground the flexible member 10 should be automatically coiled up on the reel 7, and to accomplish this desirable result a spring 28' is provided which encircles a rotary shaft 29 journaled to rotate in bearings 30 on the frame of the machine. This spring is fastened at one end to the shaft 29 and at its other end it is fastened to one of the side frames 5. A rotary motion is imparted to the spring 28' to wind it up by the rotation of the reel 7 when said reel is being rotated in the direction of the arrow *a* (Fig. 2), the shaft 29 being rotated by means of a gear 31 fastened thereto and meshing into a gear 32 journaled to rotate on a stud 33 fast to the frame of the machine. The gear 32 meshes into a gear 34 which is fastened to the shaft 14.

As a convenient means for enabling persons to be lowered by the flexible member 10, I provide a carrier 37 which consists of a frame 38 with side bars 39 extending downwardly therefrom and a base or rest 40. The person being lowered stands upon the base 40 and holds onto the side pieces 39, the frame 38 being connected to the end of the flexible member or rope 10.

The general operation of the apparatus hereinbefore specifically described is as follows: Assuming the parts to be in the position illustrated in the drawings, the person who is to be lowered stands upon the base 40 of the carrier and holds onto the sides 39. His weight causes the reel 7 to rotate in the direction of the arrow *a*. The cord 10 passes from the reel over the friction rollers 35 to the carrier and as it is paid out from the reel 7 the rotation of said reel causes the gear 12 to rotate, thus rotating the gear 13 and the shaft 14 in the opposite direction to that in which the gear 12 rotates. The shaft 14 having the gear 34 attached thereto causes said gear to rotate, thus rotating the gear 32 into which it meshes. The rotation of the gear 32 causes the gear 31 to be rotated, thus rotating the shaft 29 and winding up the spring 28'. At the same time the rotation of the gear 13 rotates the gear 15 and the drum 17 against which the brake lever is bearing. When the person being lowered by the cord 10 arrives at the ground he gets off of the carrier and releases the cord or rope 10, together with said carrier, while the person left in the room containing the life saving apparatus releases the lever 18 by slipping the collar 24 off of the arm 22. The reel thus being released from the pressure of the brake lever 18 is caused to rotate in the proper direction to wind the cord thereon by the spring 28' unwinding, and as said spring 28' unwinds it causes the different gears hereinbefore described to rotate in the opposite direction from that in which they were rotated when the cord 10 was being paid out from said reel and thus the cord 10 is wound up on the reel and the carrier is brought up to the window in order that another person may descend upon it.

As soon as the carrier arrives at the window the person in the room slips the collar 24 up on the segmental arm 22 to the index mark which indicates his weight and the device is then in condition to lower him to the ground in the same manner as hereinbefore described.

Having thus described my invention, what I claim and desire by Letters Patent to secure is:

1. A life saving apparatus having, in combination, a reel, a flexible member arranged to be coiled on said reel, a drum connected to said reel, a brake lever arranged to bear against said drum, an arm on the free end of said lever with teeth thereon, a collar slidable on said arm adapted to engage said teeth, and a spring connecting said collar to the frame of said apparatus, whereby the pressure of said brake on said drum may be varied.

2. A life saving apparatus having, in combination, a reel, a flexible member arranged to be coiled on said reel, a drum connected to said reel, a brake lever arranged to bear against said drum, a pivot for said lever, a segmental arm on the free end of said lever substantially concentric with said pivot and with teeth thereon, a collar slidable on said arm adapted to engage said teeth and a spring connecting said collar to the frame of said apparatus, whereby the pressure of said brake on said drum may be varied.

3. A life saving apparatus having, in combination, a reel, a flexible member arranged to be coiled on said reel, a drum connected to said reel, a brake lever arranged to bear against said drum, an arm on the free end of said lever with teeth on one edge thereof, a collar slidable on said arm and having a hole extending therethrough and inclined at an angle, the lower edge of said collar arranged to engage one of said teeth and the upper edge of said collar arranged to engage the opposite edge of said arm from that upon which said teeth are located and a spring connecting said collar to the frame of said apparatus whereby the pressure of said brake on said drum may be varied.

In testimony whereof I have hereunto set my hand in presence of two subscribing witnesses.

ISAAC FEIGENBAUM.

Witnesses:
  O. GRAUER,
  J. KOETCHER.